US007773033B2

(12) United States Patent
Morton et al.

(10) Patent No.: US 7,773,033 B2
(45) Date of Patent: Aug. 10, 2010

(54) MULTILAYER METAMATERIAL ISOLATOR

(75) Inventors: Matthew A. Morton, Reading, MA (US); Jiyun C. Imholt, Methuen, MA (US); Kevin Buell, Revere, MA (US)

(73) Assignee: Raytheon Company, Waltham, MA (US)

( * ) Notice: Subject to any disclaimer, the term of this patent is extended or adjusted under 35 U.S.C. 154(b) by 114 days.

(21) Appl. No.: 12/286,332

(22) Filed: Sep. 30, 2008

(65) Prior Publication Data

US 2010/0079217 A1 Apr. 1, 2010

(51) Int. Cl.
*G01S 7/28* (2006.01)

(52) U.S. Cl. ........................ 342/198; 342/175; 333/24.2

(58) Field of Classification Search ................. 342/175, 342/198; 333/24.2; 29/600
See application file for complete search history.

(56) References Cited

U.S. PATENT DOCUMENTS 6,320,547 B1 11/2001 Fathy et al.
6,933,812 B2 * 8/2005 Sarabandi et al. ........... 333/219
7,405,698 B2 * 7/2008 de Rochemont ...... 343/700 MS
7,471,247 B2 * 12/2008 Saily et al. ............ 343/700 MS
2004/0000979 A1 1/2004 Puzella et al.
2004/0066251 A1 * 4/2004 Eleftheriades et al. ...... 333/117
2006/0092079 A1 5/2006 De Rochemont
2006/0243925 A1 * 11/2006 Barker et al. ............ 250/504 R
2007/0222699 A1 9/2007 Modro
2008/0143621 A1 * 6/2008 Diaz et al. .................. 343/742
2008/0204164 A1 * 8/2008 Eleftheriades .............. 333/134
2008/0258981 A1 * 10/2008 Achour et al. .............. 343/702
2008/0258993 A1 * 10/2008 Gummalla et al. .......... 343/876
2009/0096545 A1 * 4/2009 O'Hara et al. .............. 332/129
2009/0219213 A1 * 9/2009 Lee et al. .............. 343/700 MS
2009/0251362 A1 * 10/2009 Margomenos et al. ...... 342/175
2010/0039193 A1 * 2/2010 Ryou et al. ................. 333/219

OTHER PUBLICATIONS

Chiu, Chi-Yuk, Chi-Ho Cheng, Ross D. Murch, and Corbett R. Rowell. "Reduction of Mutual Coupling Between Closely-Packed Antenna Elements," *IEEE Transactions on Antennas and Production*. vol. 55, No. 6: pp. 1732-1738, Jun. 2007.

Rajo-Iglesias, Eva, Oscar Quevedo-Teruel, Luis Inclan-Sanchez, and Luis- Enrique Garcia-Munoz. "Design of a Planar EBG Structure to Reduce Mutual Coupling in Multilayer Patch Antennas," 2007 Loughborough Antennas and Propagation Conference, Apr. 2-3, 2007, Loughborough, UK: pp. 149-152.

Buell, Kevin, Hossein Mosallaei, and Kamal Sarabandi. "Metamaterial Insulator Enabled Superdirective Array," *IEEE Transactions on Antennas and Propagation*. vol. 55, No. 4: pp. 1074-1085, Apr. 2007.

(Continued)

*Primary Examiner*—John B Sotomayor
(74) *Attorney, Agent, or Firm*—Iandiorio Teska & Coleman

(57) ABSTRACT

A multilayer metamaterial isolator and method of fabricating the same. A first layer or surface of a multilayer dielectric substrate includes a first leg of a first resonator loop. A second layer or surface of the multilayer dielectric substrate includes a second leg of the first resonator loop. A third leg of the first resonator loop extends through the multilayer dielectric substrate interconnecting the first and second legs of the first resonator loop.

24 Claims, 14 Drawing Sheets

OTHER PUBLICATIONS

Fu, Yunqi and Naichang Yuan. "Elimination of Scan Blindness in Phased Array of Microstrip Patches Using Electromagnetic Bandgap Materials," *IEEE Antennas and Wireless Propagation Letters.* vol. 3: pp. 63-65, 2004.

Donzelli, Giacomo, Filippo Capolino, Stefano Boscolo, and Michele Midrio. "Elimination of Scan Blindness in Phased Array Antennas Using a Grounded-Dielectric EBG Material," *IEEE Antennas and Wireless Propagation Letters.* vol. 6: pp. 106-109, 2007.

Chen, Richard L., David R. Jackson, Jeffery T. Williams, and Stuart A. Long. "Scan Impedance of RSQ Microstrip Antennas in a Finite Array," *IEEE Transactions on Antennas and Propagation.* vol. 53, No. 3: pp. 1098-1104, Mar. 2005.

Mohammadian, Alireza, Noel M. Martin, and Donald W. Griffin. "A Theoretical and Experimental Study of Mutual Coupling in Microstrip Antenna Arrays," *IEEE Transactions on Antennas and Propagation.* vol. 37, No. 10: pp. 1217-1223, Oct. 1989.

Pozar, David M., and Daniel H. Schaubert. "Scan Blindness in Infinite Phased Arrays of Printed Dipoles," *IEEE Transactions on Antennas and Propagation.* vol. AP-32, No. 6: pp. 602-610, Jun. 1984.

Rahmat-Samii, Y. and H. Mosallaei. "Electromagnetic Band-Gap Structures: Classification, Characterization, and Applications," 11$^{th}$ International Conference on Antennas and Propagation, Apr. 17-20, 2001, Conference Publication No. 480: pp. 560-564, 2001.

Maslovski, S., P. Ikonen, I. Kolmakov, S. Tretyakov, and M. Kaunisto. "Artificial Magnetic Materials Based on the New Magnetic Particle: Metasolenoid, in Progress in Electromagnetic Research," PIER, EMW Publishing, Cambridge, USA, vol. 54: pp. 61-81, 2005.

Written Opinion of the International Searching Authority for PCT Application No. PCT/US09/05261 mailed Nov. 13, 2009 (eight (8) pages).

* cited by examiner

MULTILAYER METAMATERIAL ISOLATOR

FIELD OF THE INVENTION

The subject invention relates to isolation technology, microwave antenna arrays, and metamaterial isolators.

BACKGROUND OF THE INVENTION

Radar systems typically include a number of radiating elements often in an array. The recent trend is to increase the number of radiating elements in an attempt to attain better performance. There is a relationship between the number of radiating elements in a phased array and system performance with regard to gain, beam-steering, ECCM (electronic counter-counter measures, for example, anti-jamming), null-steering, and advanced beam forming capability. The result is often a larger size array which increases the complexity of signal routing, heat management, transportation of the array to its intended location, and the like. When the size of the array is reduced to address these concerns, the radiating elements are placed closer together. The result is an interaction between adjacent radiating elements. Coupling (e.g., cross-talk) across adjacent radiating elements causes significant performance degradation including radiation pattern distortion and scan blindness. Indeed, the interaction between the resonating elements increases on the order of the inverse square of the separation distance.

The article "Metamaterial Insulator Enabled Superdirective Array," by Buell et al., (IEEE *Transactions on Antennas and Propagation*, Vol. 55, No. 4, April 2007), incorporated herein by this reference, describes a metamaterial isolator including a unit cell made of a dielectric with the face having a planar metallized (e.g., copper) spiral. A number of these unit cells are stacked together serving as an isolating wall between adjacent radiating elements in an effort to block electromagnetic energy from being transmitted from one radiating element to the other. The result was a fairly narrow band gap isolating region (for both transmission and reflection) between adjacent radiating elements. Furthermore, each individual unit cell had to be aligned to an adjacent unit cell which created a need for accurate alignment and the potential for modified behavior arising from the air gaps between the unit cells. Addressing the latter problem requires the use of a polymeric filler material that exhibits the same electromagnetic properties as the substrate. The proposed technique also requires surface machining of the substrate containing the radiating elements and corresponding feed networks. The added steps associated with integrating individual unit cells adds to the cost and complexity of a system-level solution. Finally, the metallization constituting a resonator loop was constrained to a single vertical plane.

Chiu et al. in "Reduction of Mutual Coupling Between Closely-Packed Antenna Elements," IEEE *Transactions on Antennas and Propagations*, Vol. 55, No. 6 (June 2007) proposes a new ground plane structure in an attempt to reduce mutual coupling between closely-packed antenna elements. One disadvantage of such a technique is a narrow band and a solution useful for only very narrow element spacing. Rajo-Iglesias et al. in "Design of a Planer EBG Structure to Reduce Mutual Coupling in Multilayer Patch Antennas," 2007 Loughborough Antennas and Propagation Conference, (Apr. 2-3, 2007), proposed a relatively large embedded single-layer electromagnetic band gap structure which also exhibited a narrow band width. Fu et al. in "Elimination of Scan Blindness in Phase Array of Microscript Patches Using Electromagnetic Band Gap Materials," IEEE *Antennas and Wireless Propagation Letters*, Vol. 3, (2004) proposed an electromagnetic bandgap (EBG) structure which required very large isolators and a specialized dielectric material. Donzelli et al. in "Elimination of Scan Blindness in Phased Array Antennas Using a Grounded-Dielectric EBG Material," *IEEE Transactions on Antennas and Propagation*, Vol. 6, (2007) proposes a grounded-dielectric EBG substrate which exhibited a narrow bandwidth and a complicated and expensive substrate design. Chen et al. in "Scan Impedance of RSW Microstrip Antennas in a Finite Array," IEEE *Transactions on Antennas and Propagation*, Vol. 53, No. 3 (March 2005) disclosed shorted annular rings incorporated into an antenna patch used to reduce surface waves and scan variation but were limited to 20° scanning and required large element spacing, and fairly large elements.

BRIEF SUMMARY OF THE INVENTION

It is therefore an object of this invention to provide a new isolator for radar arrays.

It is a further object of the subject invention to provide such an isolator which can be manufactured in a simpler fashion and at a lower cost.

It is a further object to provide such an isolator which can be manufactured using established techniques.

It is a further object to provide such an isolator which exhibits a wider bandgap isolation.

It is a further object to provide such an isolator which enables a dense population of radiating elements in a more compact system.

It is a further object to provide such an isolator which enables super-directive phased arrays with advanced beam-forming capabilities.

It is a further object of this invention to provide a new isolator for electronic systems other than radar arrays.

The subject invention results, at least in part, from the realization that an improved isolator includes a metallized resonator loop with at least one leg extending through the thickness of a multilayer dielectric substrate interconnecting other legs formed on different layers of the substrate.

The subject invention features a multilayer metamaterial isolator comprising a multilayer dielectric substrate, a first layer or surface of the multilayer dialectric substrate including a first let of a first resonator loop, a second layer or surface of the multilayer dielectric substrate including a second leg of the first resonator loop, and a third leg of the first resonator loop extending through the multilayer dielectric substrate interconnecting the first and second legs of the first resonator loop.

In one typical embodiment, there is a second resonator loop having a first leg on the one layer or surface of the multilayer dielectric substrate adjacent the first leg of the first resonator loop, a second leg on a different layer or surface of the multilayer dielectric substrate adjacent the second leg of the first resonator loop, and a third leg extending through the multilayer dielectric substrate interconnecting the first and second legs of the second resonator loop. In one example, the second legs of the first and second resonator loops include interdigitated spaced fingers. Typically, the first and second layers of the multilayer dielectric substrate are separated by intermediate layers of the multilayer dielectric substrate. In one example, the first leg and the second leg of the first resonator loop are offset.

In one aspect of the subject invention, the first resonator loop constitutes a unit cell, the isolator further including a strip of adjacent unit cells. This isolator strip may be used in a number of environments. In one example, the multilayer dielectric substrate further includes adjacent patch radiators separated by said strip. In another example, a first subsystem is separated from a second subsystem by said strip. The first subsystem may include a radar transmission subsystem and the second subsystem may include a radar receiving subsystem. In still another example, the multilayer substrate includes integrated circuitry and a strip is disposed between selected circuit elements. The isolator may further include multiple strips of adjacent unit cells.

In one aspect of the subject invention, a metamaterial isolator includes a dielectric substrate and one region of the dielectric substrate includes a first leg of a resonator loop. A second region of the dielectric substrate includes a second leg of the resonator loop. A third leg of the resonator loop extends through the dielectric substrate interconnecting the first and second legs of the resonator loop.

Another aspect of the subject invention features a substrate defined by first and second spaced planes and a third transverse plane. A resonator loop includes one leg on the first plane of the substrate, a leg on the second plane, and a leg on the third plane. Still another aspect of the subject invention features a first resonator loop including a first leg extending in one direction, a second leg spaced from the first leg and extending in the same direction, and a third leg extending in a different direction interconnecting the first and second legs. A second resonator loop may include a first leg adjacent the first leg of the first resonator loop, a second leg adjacent the second leg of the first resonator loop, and a third leg interconnecting the first and second legs of the second resonator loop. In one example, the second legs of the first and second resonator loops include interdigitated spaced fingers.

One method of fabricating an array of radiating elements in accordance with the subject includes forming, on one layer or surface a dielectric substrate, a first leg of a first resonator loop. On another layer or surface of the dielectric substrate, a second leg of the first resonator loop is formed between adjacent radiating elements. A via through the dielectric substrate is metallized forming a third leg of the first resonator loop interconnecting the first and second legs.

The adjacent radiating elements are typically formed on the same layer as the second leg. Fabricating a second resonator loop may include forming a first leg adjacent the first leg of the first resonator loop, forming a second leg adjacent the second leg of the first resonator loop, and forming a third leg extending through the dielectric substrate layers interconnecting the first and second legs of the second resonator loop.

The method may further include forming interdigitated spaced fingers of the first and second resonator loops. The method in which the first resonator loop constitutes a unit cell may further include forming a strip of adjacent unit cells.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
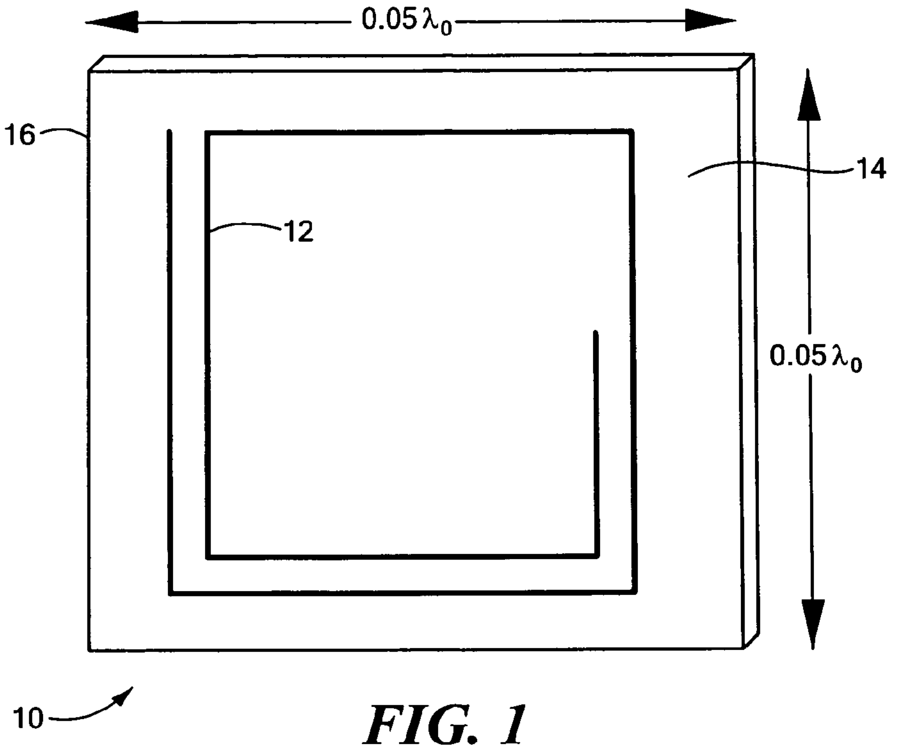
FIG. 1 PRIOR ART
FIG. 1 is a schematic front view of a prior art isolator unit-cell design.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
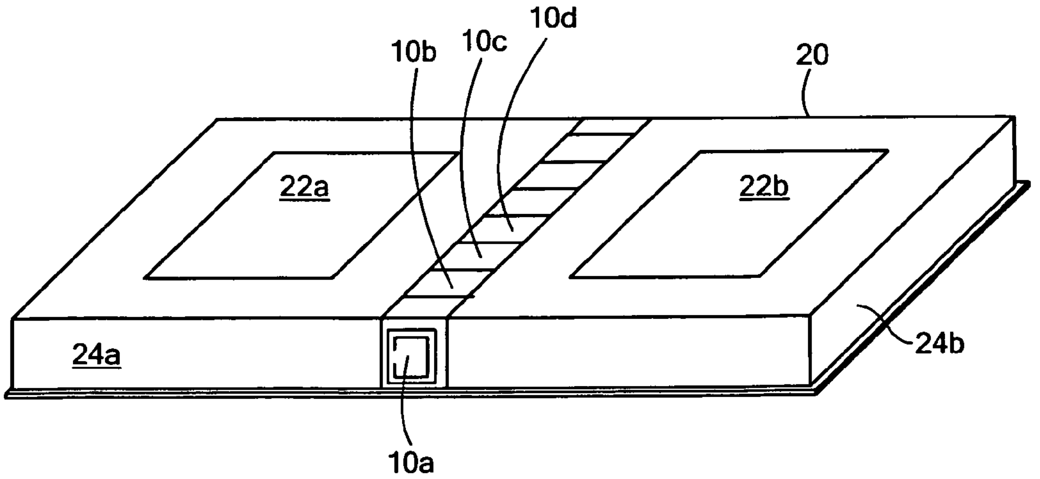
FIG. 2 PRIOR ART
FIG. 2 is a schematic three-dimensional top view of a proposed implementation of a metamaterial isolator in accordance with the prior art.
Figure 3:
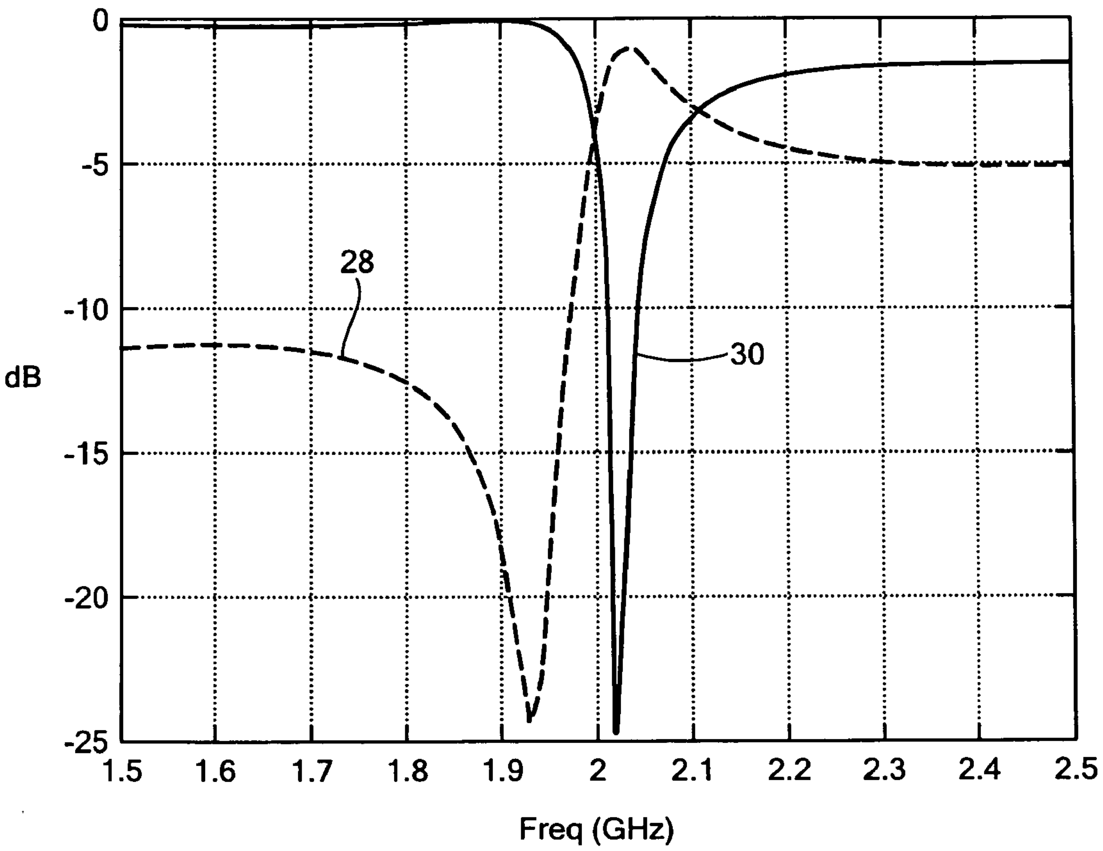
FIG. 3 is a graph showing the transmission and reflection characteristics between adjacent radiating elements using the metamaterial isolator shown in FIG. 2.

FIG. 1 shows a unit cell isolator 10 as discussed in Buell et al., "Metamaterial Insulator Enabled Superdirective Array," IEEE *Transactions on Antennas and Propagation*, Vol. 55, No. 4 (April 2007). Metallic trace 12 is formed on face 14 of dielectric substrate 16. Thus, the trace is confined to one plane. As shown in FIG. 2, a number of these unit cells 10*a*-10*d* and the like are adhered together in a strip 20 (a "metamaterial slab") between radiating elements 22*a* and 22*b* on substrates 24*a* and 24*b*, respectively. FIG. 3 shows the transmission characteristics 30 and reflection characteristics 28 through the strip of unit cells. The region of interest for isolator applications is the strong stopband region occurring just above 2 GHz. When copper was used for the spiral and a commercially available host dielectric used, simulations showed a 10 dB isolation stopband of 2% of bandwidth and a peak isolation of 25 dB.

As discussed in the Background section above, the result is a fairly narrow bandgap isolation region for both transmission and reflection. Furthermore, each unit cell must be aligned with an adjacent cell and in general integrating individual unit cells together in a strip between two radiating elements adds to the cost and complexity of the system.

Figure 4:
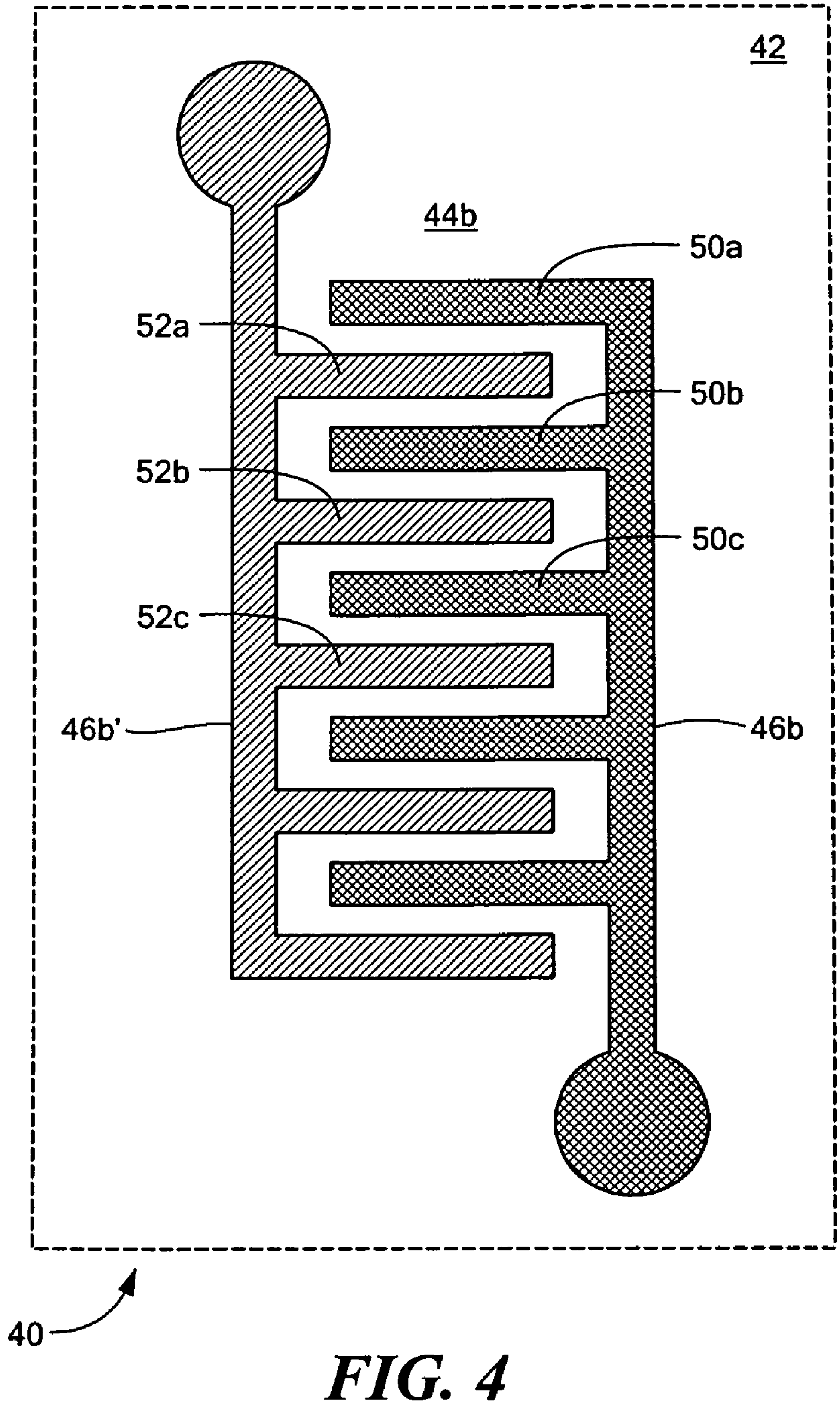
FIG. 4 is a schematic top view of an example of a multilayer metamaterial isolator unit cell in accordance with the subject invention.
Figure 5:
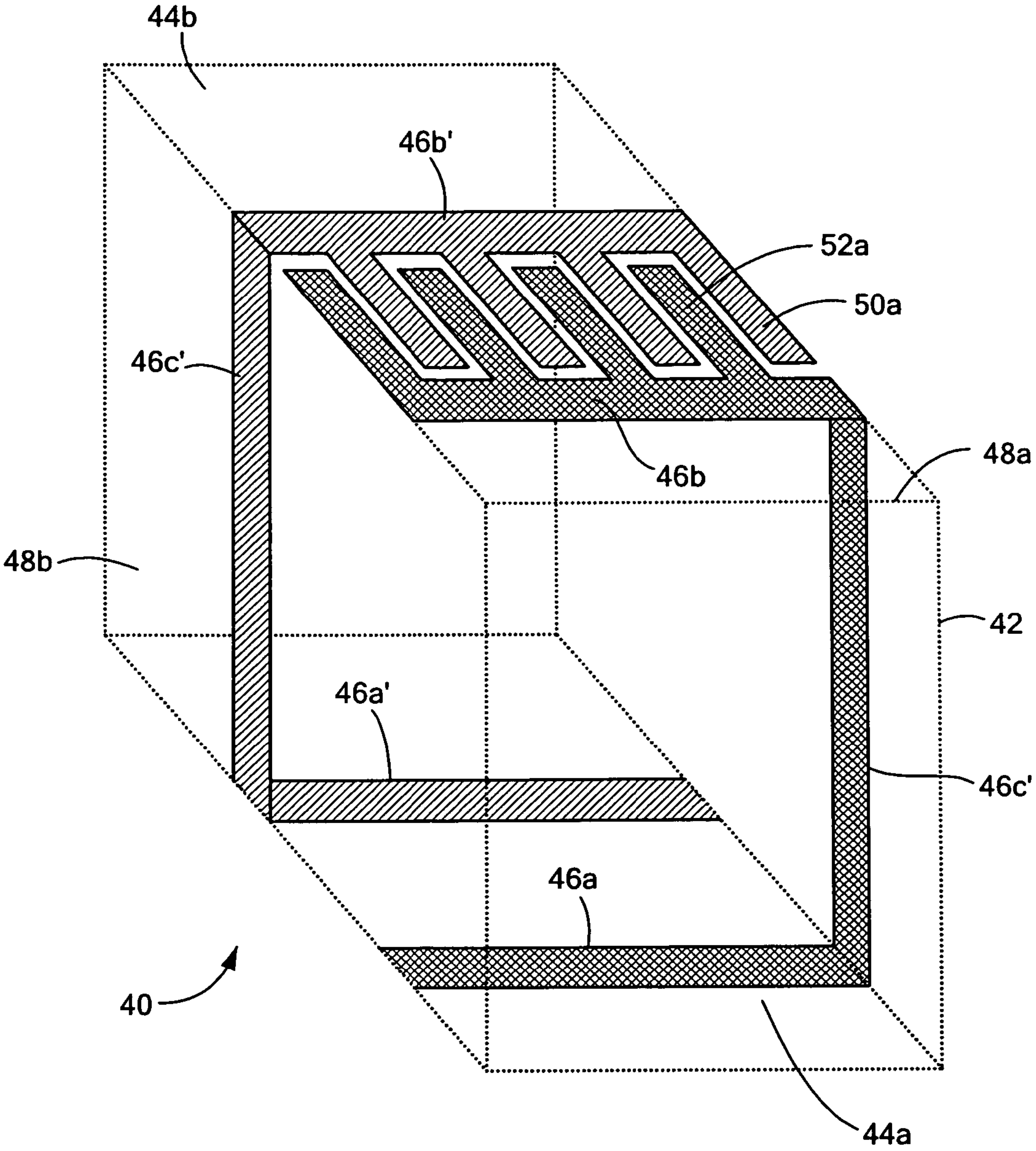
FIG. 5 is a partial schematic three-dimensional top view of the multilayer metamaterial isolator unit cell shown in FIG. 4.

A novel multilayer metamaterial isolator 40, FIGS. 4-5 in accordance with the subject invention includes a multilayer dielectric substrate 42 (typically made of printed circuit board material) shown in phantom with a first layer 44*a* which may but need not be the bottom most layer. On layer 44*a* is first leg 46*a* of first resonator loop 48*a*. Multilayer dielectric substrate 42 includes second layer 44*b* which may but need not be the top most layer. Second layer 44*b* is typically spaced from first layer 44*a* by other intermediate layers of the multilayer dielectric substrate 42 (not shown for clarity). Second layer 44*b* includes leg 46*b* of first resonator loop 48*a*. Third leg 46*c* of first resonator loop of 48*a* extends through the thickness of the dielectric substrate layers and interconnects first leg 46*b* and second leg 46*a*. Third leg 46*c* is typically fabricated by forming and metallizing a via as known in the art. Copper may be used for each leg of the resonator loop.

In this particular example, each unit cell further includes second resonator loop 48*b* with first leg 46*a*' on substrate layer 44*a*, second leg 46*b*' on substrate layer 44*b*, and third leg 46*c*' extending through the thickness of the dielectric substrate layers interconnecting legs 46*a*' and 46*b*'.

As shown, leg 46*a*' of loop 48*b* is adjacent to and extends in the same direction as leg 46*a* of loop 48*a* and leg 46*b*' of loop 48*b* is adjacent to and extends in the same direction as leg 46*b* of loop 48*a*. Vertical (in the figure) legs 46*c* and 46*c*' are offset and opposing each other. But, this design is not a limitation of the subject invention as legs 46*a*' and 46*b*' of resonator loop 48*b* may even be on different layers of the dielectric substrate than legs 46*a* and 46*b* of resonator loop 48*a*. Also, although only three legs are shown for each resonator loop, there may be additional legs resulting in a spiral resonator loop configuration. Also, the legs need not be straight as shown in FIGS. 4-5.

Good results regarding capacitive coupling were obtained in one embodiment by including fingers 50*a*-50*c*, FIG. 4 and the like extending from leg 46*b* of loop 48*a* interdigitated with fingers 52*a*-52*c* and the like extending from leg 46*b*'. Such a construction was not possible in accordance with the prior art discussed above with respect to FIGS. 1-3.

Figure 6:
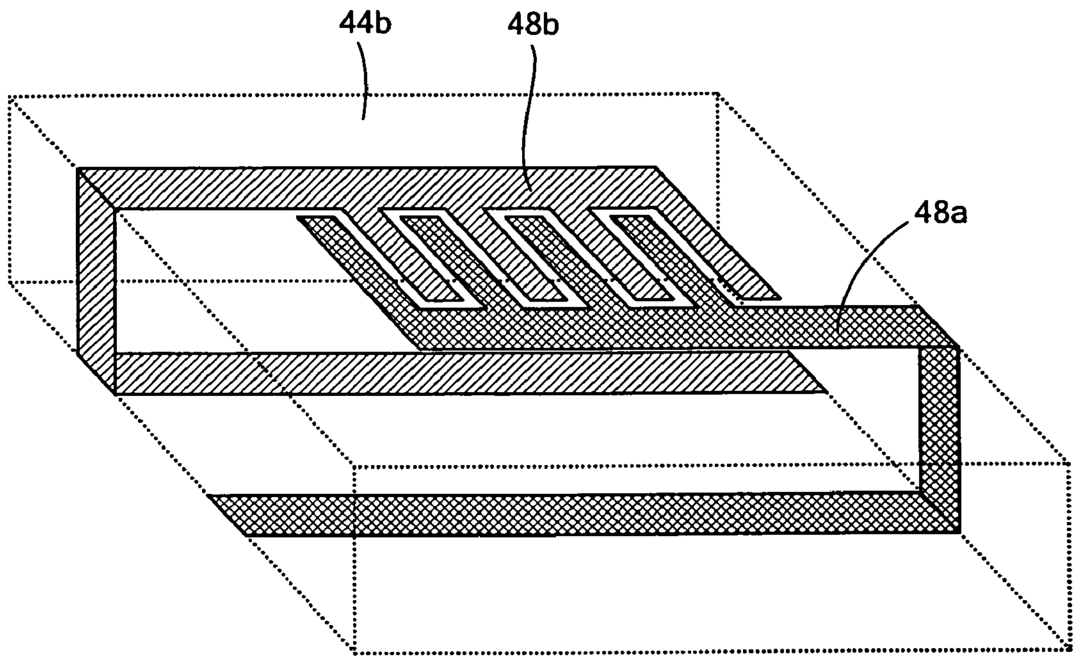
FIG. 6 is a schematic three-dimensional top view showing a more compact multilayer metamaterial isolator in accordance with the subject invention.

The height of the unit cell may be decreased while the unit cell width increases such that the total loop area (and hence inductance) remains constant as shown in FIG. 6. The reduced height accommodates possible fabrication limitations and the width is expanded to retain the total looped area. Note, however, that as the height decreases the capacitance coupling between the top and bottom layers increases which may create a distributed capacitance within each resonator loop in contrast with the desired capacitive coupling between resonator loops 48*a* and 48*b*. It is desirable that the resonator frequency not shift out of the desired band of operation. The minimum allowable height of the unit cell is dependent upon the material properties that contribute to the intra-resonator capacitance. A larger relative permittivity in the substrate material will increase capacitive coupling between the top and bottom layers of the substrate to a larger degree than the increase in capacitive coupling in the interdigitated region on surface 44*b*. This is due to a lower effective capacitance experience on the surface-defined metallization because of superstrate field interaction assuming the superstrate (e.g., air) exhibits a lower permittivity than the substrate. While the aspect ratio limit of a given unit cell is determined by choices in materials and operational frequency, a ratio as large as 1:5 is possible.

In accordance with the subject invention, the typical metamaterial isolator strip include multiple instances of the unit cells shown in FIGS. 4-6. Because the total effect of the metamaterial behavior is the result of the individual unit cell behavior, the unit cell will first be explained. Typically, the metamaterial unit cell includes an inductance related to the overall resonator loop area and a capacitance dominated by a capacitive coupling between split resonator loops 48*a* and 48*b*. Both the capacitance and inductance determine the unit cell behavior such as the resonant frequency. Vertical metal vias can be used to connect metal paths that reside on opposite sides of a single layer or a stack of layered substrates. Two adjacent metal strips are placed some distance apart and extend past the adjacent region to accommodate an enlarged metal surface area for a via. Via cell inductance is a function of the area defined by the two split resonator loops as if the two independent resonators have merged to form a single rectangular structure. Fabrication tolerance associated with pattern definition in surface metallization and via formation may limit the amount of capacitive coupling possible for adjacent lines on layer surfaces and between vertical vias. To provide the requisite capacitance, the top and/or bottom surface matter may be defined so as to include a region of interdigitated finger couplings as shown in FIGS. 4 and 5. The location of the interdigitation along the unit cell resonator does not seem to have an appreciable impact on metamaterial behavior. As such, the capacitive structure should reside on the sections of the resonator that allow for minimal spacing and best tolerance. The surface layers allow for much greater control over adjacent metal spacing and width than do the formed vias. For the best performance and tolerance, all features with critical dimensions such as capacitive coupling reside, in this example, on surface layers.

Figure 7A:
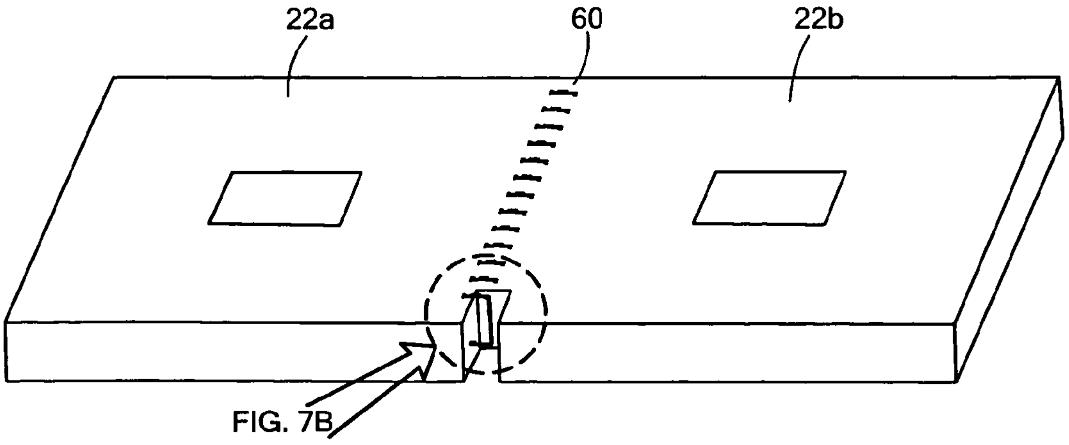
FIG. 7A is a schematic three-dimensional top view of a multilayer metamaterial isolator strip located between adjacent radiating elements in a phased radar array in accordance with the subject invention.
Figure 7B:
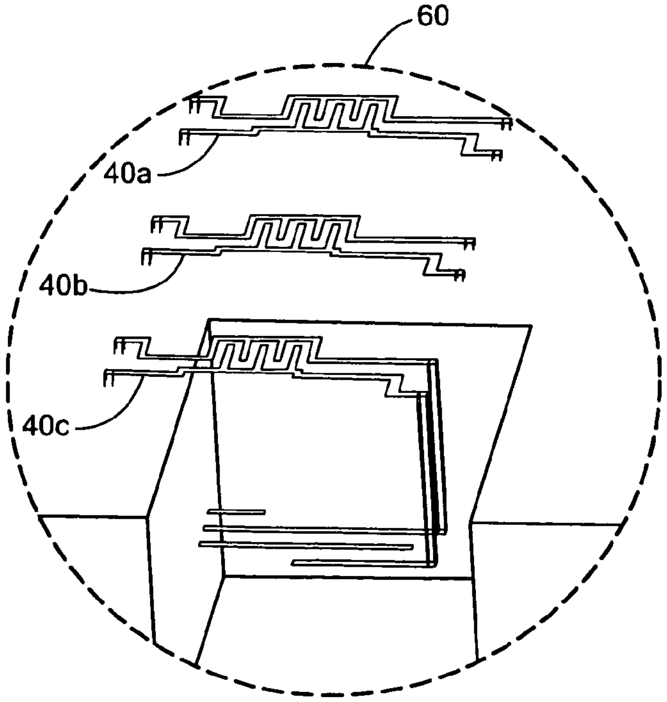
FIG. 7B is an enlarged view of the isolator strip portion shown in FIG. 7A.
Figure 8A:
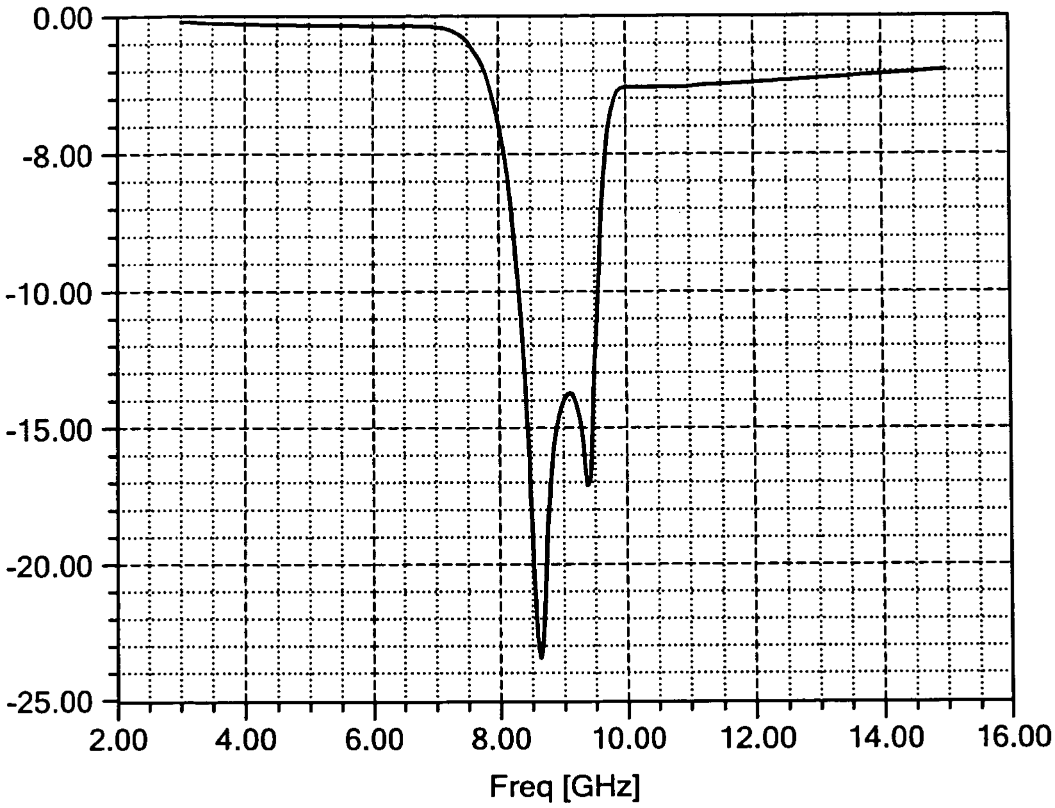
FIG. 8A is a graph showing the bandwidth for a single cell wall for the isolator shown in FIGS. 7A-7B.
Figure 8B:
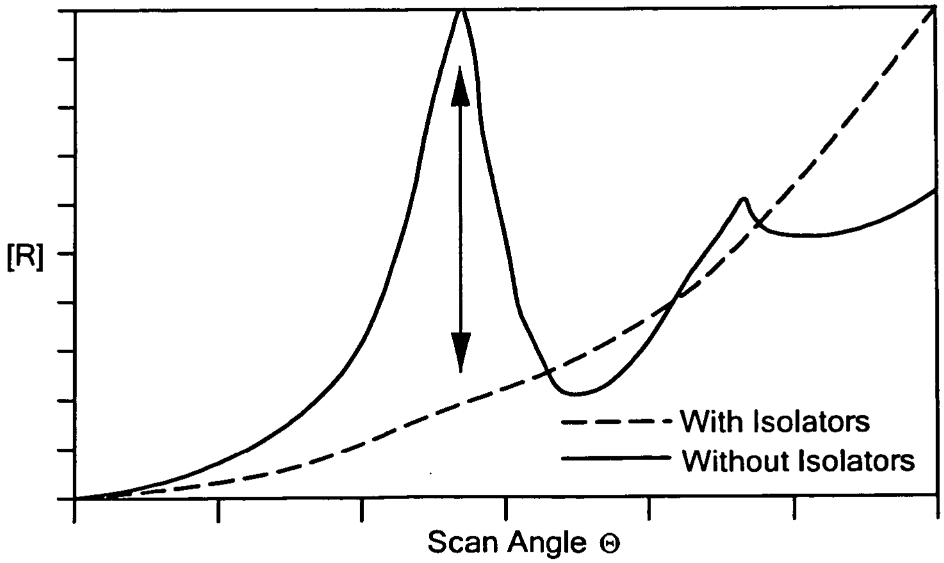
FIG. 8B is a graph showing how scan blindness is reduced using the metamaterial isolator technology shown in FIGS. 7A and 7B.

A single unit cell may be insufficient for isolating two adjacent radiating patches. Because the unit cell is extremely small compared to the radiated wavelength, the energy interacting with a single cell is also small. To provide a useful amount of isolation, a strip of isolators 60, FIGS. 7A-7B are fabricated between radiating elements 22*a* and 22*b* where the cross-talk is the greatest. As shown, strip 60 includes unit cells 40*a*, 40*b*, 40*c*, and the like are fabricated between patch radiators 22*a* and 22*b* yielding a 14% bandwidth as shown in FIG. 8B for a single cell wall and greater than 40% with a multi-cell topology. FIG. 8B shows how scan blindness is also reduced via the strip of isolator unit cells in accordance with the subject invention. The isolator may also be used for alleviating other beam distortion phenomena.

Figure 9:
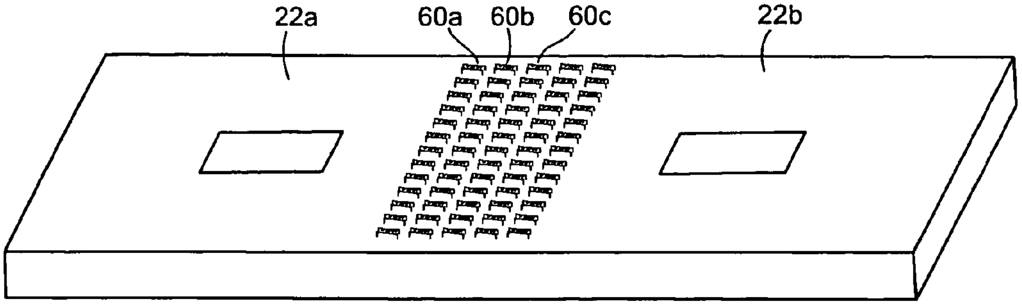
FIG. 9 is a schematic three-dimensional top view showing a number of isolator strips disposed between adjacent radiating elements in a phased radar array in accordance with the subject invention.
Figure 10:
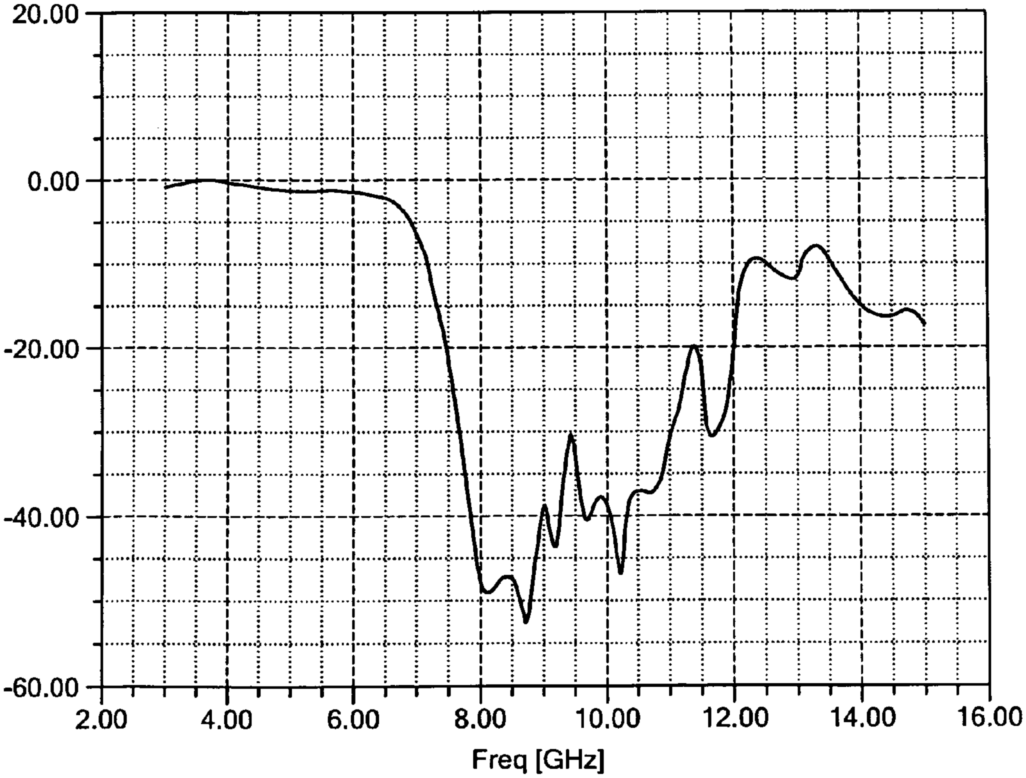
FIG. 10 is a graph showing the extended bandwidth obtained via the multiple metamaterial isolator strips shown in FIG. 9.

Furthermore, the embedded resonator loops can be fabricated at the same time and in the same manner as the patch radiators and other components of a phase array radar system. Indeed, FIG. 9 shows multiple strips 60*a*, 60*b*, 60*c*, and the like between patch radiators 22*a* and 22*b*. The compact form-factor of the subject invention allows multiple cells to reside between radiating elements 22*a* and 22*b*. Each cell wall may be tuned to cover a portion of the band. The total bandwidth is limited only by the tolerable multi-cell wall width. The multi-cell wall width is dependent upon the individual cell width which can be minimized by increasing the height of the cell or providing additional resonator loops within each cell. As shown in FIG. 10, overlapping bands provide metamaterial bandgap over more than 40% bandwidth at little or no additional cost to the system.

Figure 11A:
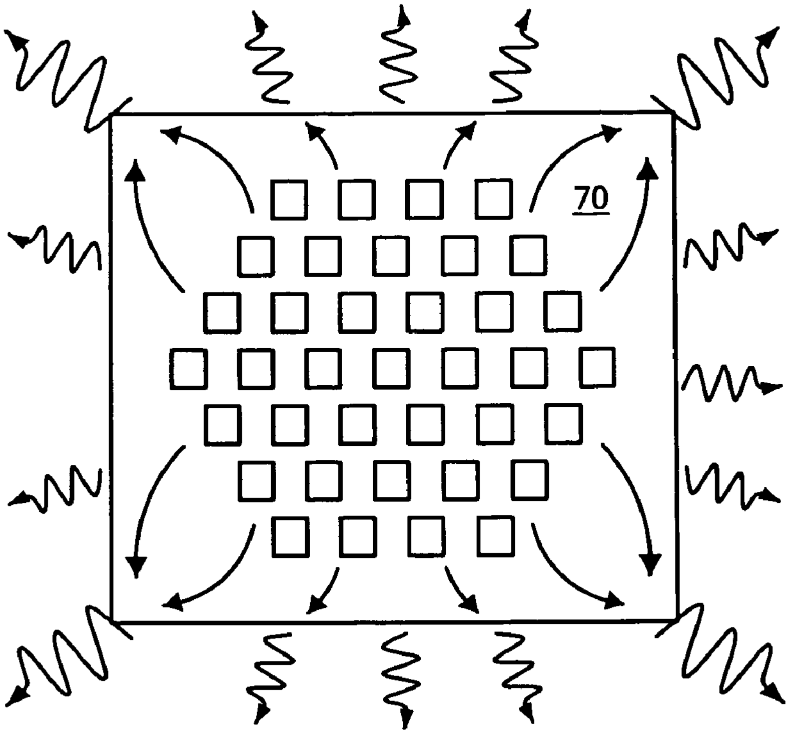
FIG. 11A PRIOR ART
FIG. 11A is a schematic top view showing the edge effects of a radar panel array in accordance with the prior art.
Figure 11B:
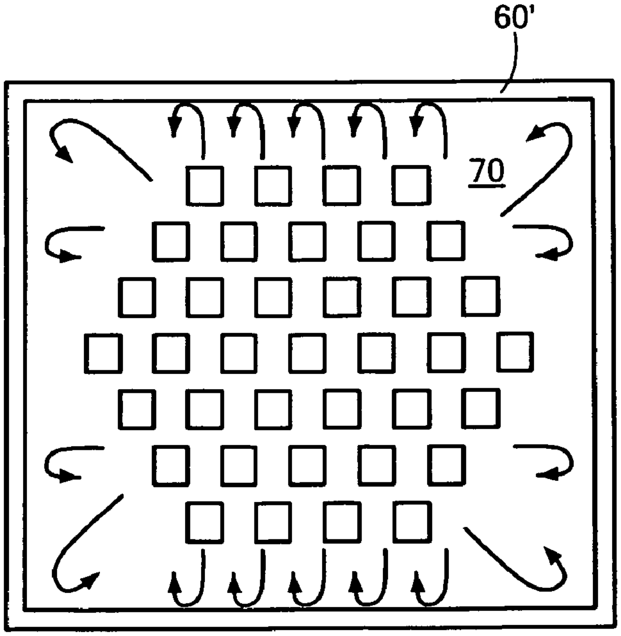
FIG. 11B is a schematic top view showing a strip of multilayer metamaterial isolators about the periphery of the panel array of FIG. 11A in order to isolate the panel array.

In another example, a prior radar panel array 70, FIG. 11A has a finite ground plane which causes scattering at any discontinuity. The scattered energy interferes with nearby arrays and can also degrade the front-back ratio. As shown in FIG. 11B where strip 60' of isolator unit cells in accordance with the subject invention surround the array, the metamaterial isolation walls reflect fields before reaching any ground discontinuity thereby approving the front-back ratio and preventing interference with nearby arrays.

Figure 12:
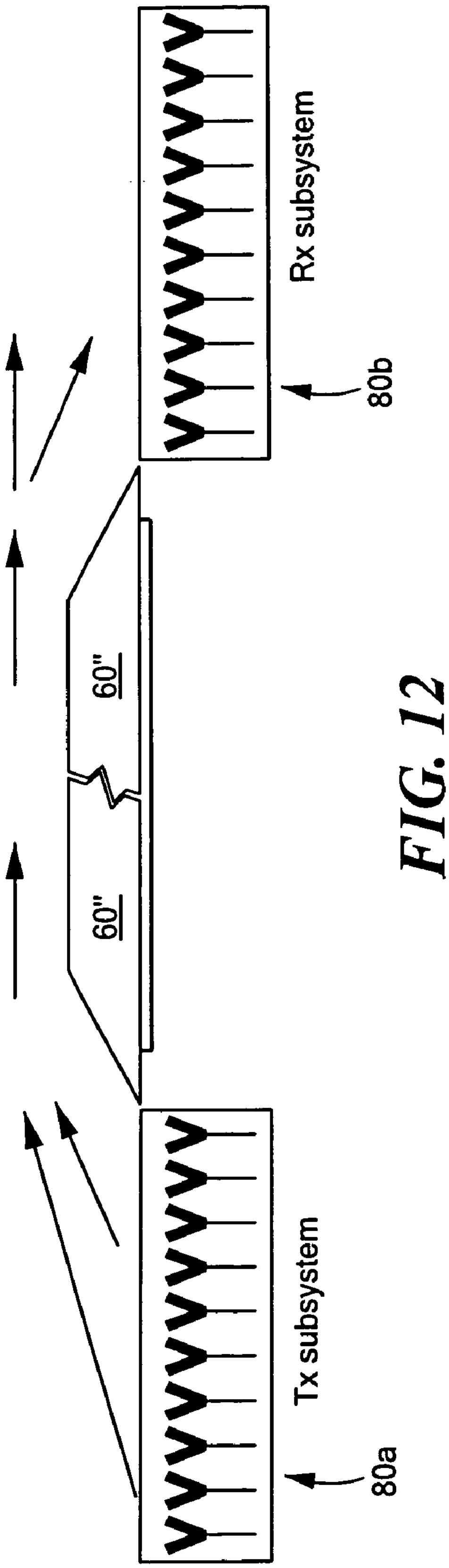
FIG. 12 is a highly schematic depiction of how the multilayer metamaterial isolator technology of the subject invention can be used to isolate different radar subsystems in accordance with the subject invention.

In another example, FIG. 12 shows first subsystem 80*a* (e.g., a radar transmission subsystem) and a second subsystem 80*b* (e.g., a radar receiving subsystem) each isolated from each other by one or more strips 60" of isolation unit cells in accordance with the subject invention. Array to array interference often requires, in the prior art, expensive absorbers and a large separation. Employing the metamaterial isolator technology of the subject invention allows the arrays to be more easily isolated. As such, the isolator technology of the subject invention can be used as a stand-alone isolation material block.

Figure 13A:
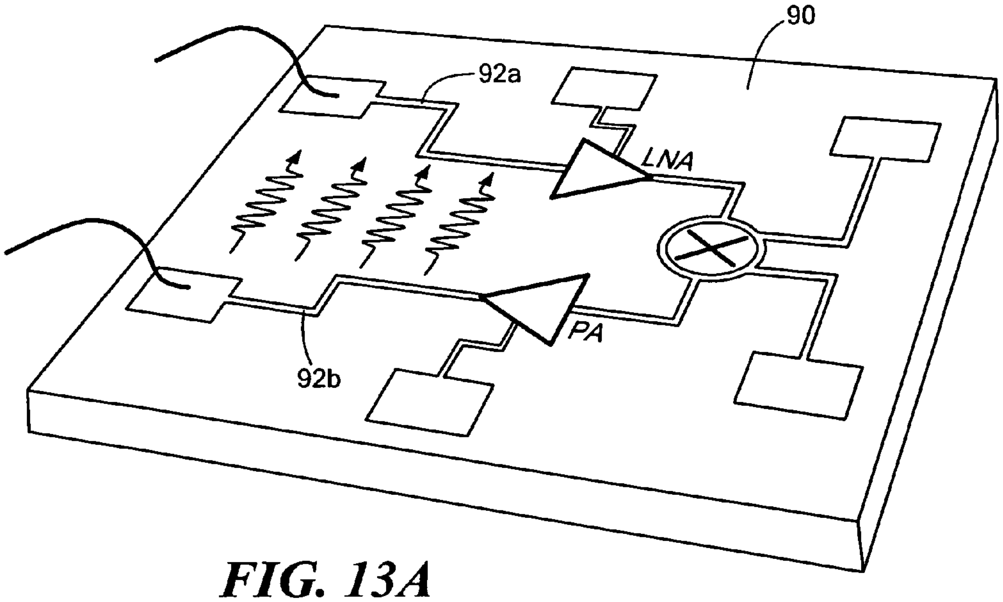
FIG. 13A PRIOR ART
FIG. 13A is a schematic three-dimensional top view showing cross-talk between circuit elements of an integrated circuit chip in accordance with the prior art.
Figure 13B:
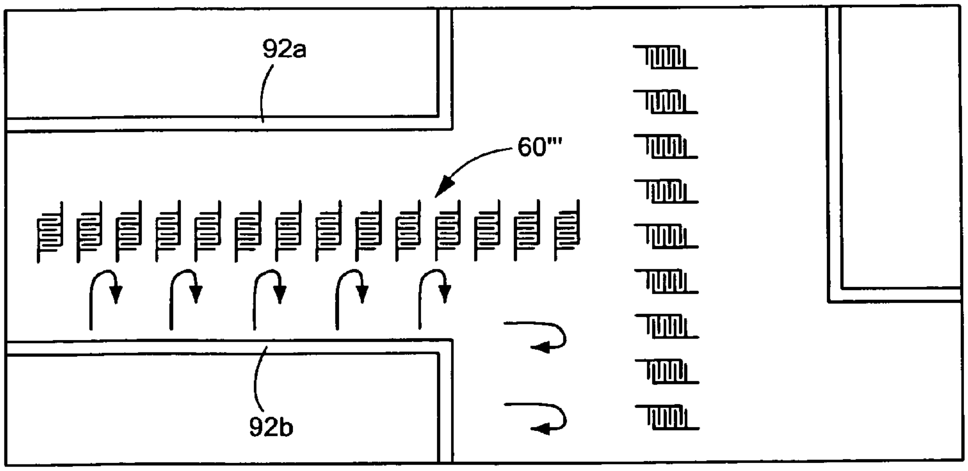
FIG. 13B is a schematic top view showing a portion of the circuitry of FIG. 13A now including a strip of multilayer metamaterial isolators in accordance with the subject invention to reduce cross-talk.

FIGS. 13A-13B show another use of the subject invention where integrated circuit chip 90 includes conductors 92*a*, 92*b*. To prevent cross-talk, isolation strip 60'Δ, FIG. 13B is employed. In one example, the integrated circuit chip is a radar MMIC module which can create feedback and exhibits reduced sensitivity. Employing the metamaterial isolator technology of the subject invention provides greater isolation than existing methods.

Figure 14:
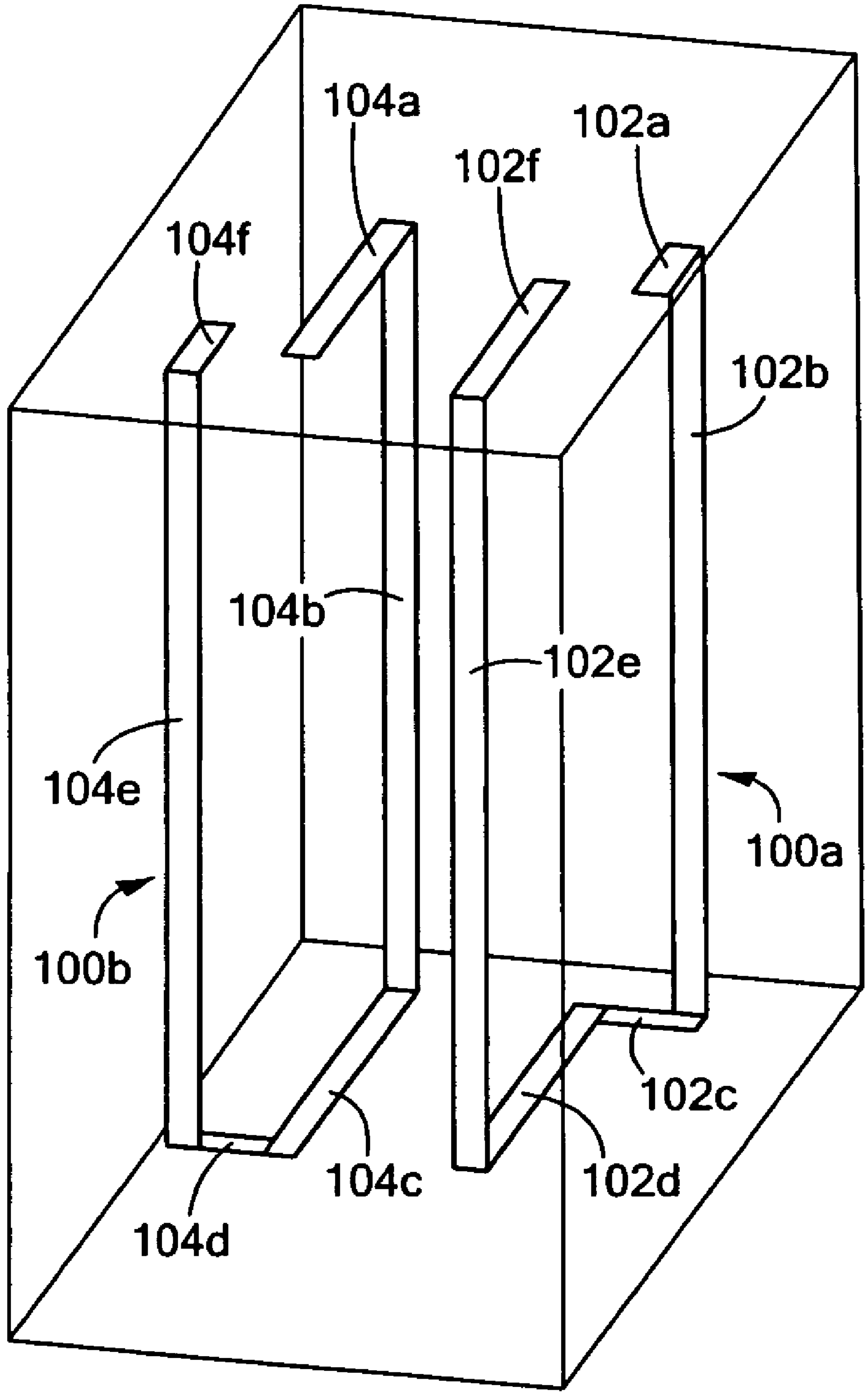
FIG. 14 is a schematic three-dimensional front view showing another example of a multilayer metamaterial isolator unit cell in accordance with the subject invention.
Figure 15:
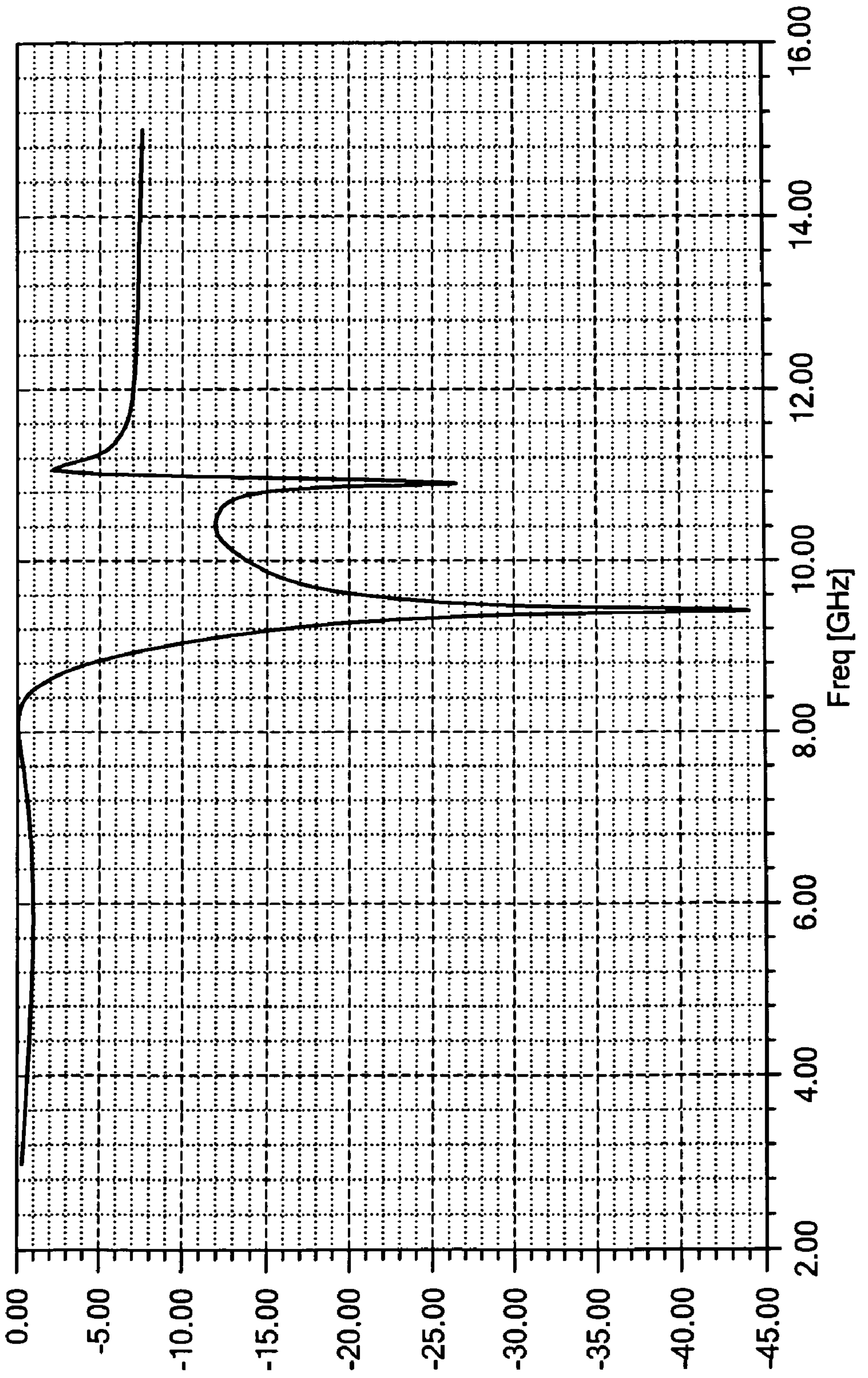
FIG. 15 is a graph showing the bandwidth of the multilayer metamaterial isolator unit cell of FIG. 14.

FIG. 14 shows another version of an isolation unit cell 1.6 mm wide, 1.4 mm long and 2.5 mm tall. First resonator loop 100*a* includes metal legs 102*a*-102*f* as shown. Legs 102*f* and 102*a* are typically on one layer or surface of the dielectric substrate, legs 102*c* and 102*d* are on another layer or surface of the dielectric substrate, and legs 102*b* and 102*e* extend through the thickness of the substrate and interconnect legs 102*a* and 102*c* and 102*f* and 102*d*, respectively. In this design, legs 102*f* and 102*a* are offset from each other due to leg 102*d* extending perpendicularly from leg 102*c*. Legs 102*e* and 102*b* are also offset as shown. Resonator loop 100*b* similarly includes legs 104*a*-104*f*. In this design, an interdigitated section may not be necessary and the basic cell design includes two split-ring resonator loops coupled together. There is also a reduced sensitively to fabrication tolerances with this design. Simulated isolator bandwidth results are shown in FIG. 15.

Figure 16A:
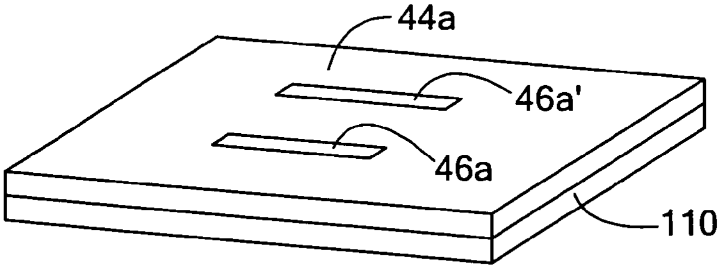
FIGS. 16A-16C are highly schematic three-dimensional front views showing the primary steps associated with one method of fabricating multilayer metamaterial isolators in accordance with the subject invention.
Figure 16B:
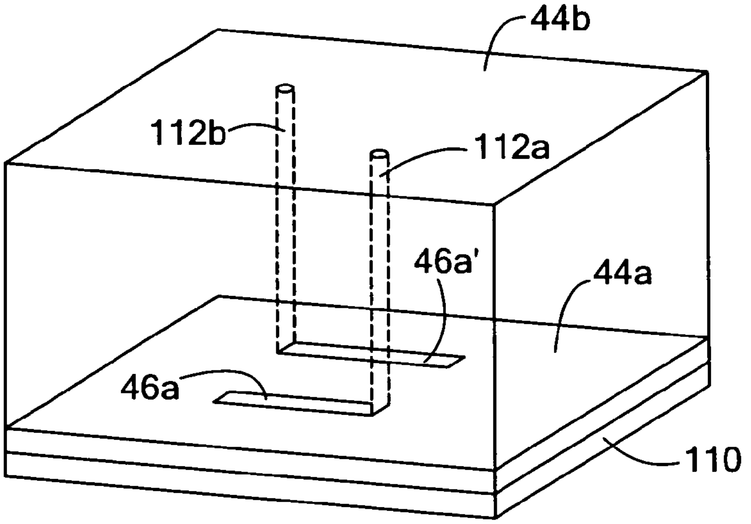
Figure 16C:
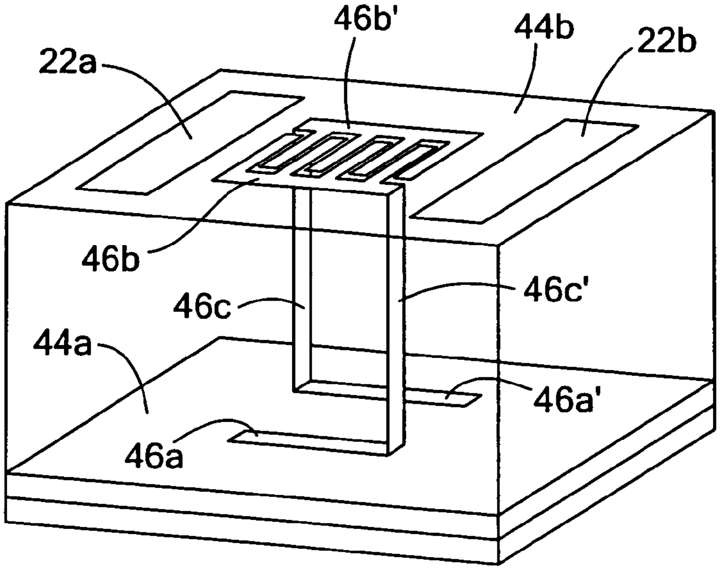

FIGS. 16A-16C depict one method of fabricating an array of radiating elements in accordance with the subject invention. On one layer 44A of a multilayer dielectric substrate, legs 46*a* and 46*a*', FIG. 16A of two resonator loops are formed typically by masking a metallization layer and etching away all but the desired leg shape. Adjacent layer 110 may be a ground plane, for example. The other layers of the panel are then built up as shown in FIG. 16B and vias 112*a* and 112*b* are formed to extend from layer 44*b* to legs 46*a* and 46*a*', respectively. The vias are then filled with metal resulting in legs 46*c* and 46*c*', FIG. 16C. Masking and etching operations are performed on layer 44*b* to form legs 46*b* and 46*b*' (with interdigitated fingers if desired) and patch radiators 22*a* and 22*b*.

In any embodiment, the various problems associated with the prior art planar unit cell concept are mitigated in accordance with a three-dimensional approach of the subject invention. Typically, preexisting layers within a multi-layer antenna array substrate are used to form the strips of metamaterial isolators with inter-resonating coupling on the surface layers and vias connecting the sections of each resonator loop on separate layers. Metamaterial behavior, in particular a high level of isolation, can be achieved at a significantly lower cost than planar methods. By defining the metamaterial isolator strips, or “metasolenoids,” in a three-dimensional space within the pre-existing multilayer-substrate, the objectives of the subject invention are realized. Instead of confining metallization layers to a single vertical plane, the axis of both the capacitive coupling and the resonant rings are translated to alternative axes. Furthermore, these new axes are both orthogonal to one another and to the axis that defines the overall width of the collapsed resonator loop. The metamaterial isolators of the subject invention provide the best means to isolate physically-small antenna arrays with minimal performance degradation. The result is a significant system cost benefit with little to no added cost for the additional metamaterial structures.

A more easily fabricated and lower cost metamaterial isolator thus includes a resonator loop with at least one leg extending through the thickness of a multilayer substrate resulting in a three-dimensional verses the two-dimensional structure of the prior art. The isolator of the subject invention is also highly versatile as shown above with respect to FIGS. 7-13. Those skilled in the art will also discover new uses for embodiments of the subject invention.

Therefore, although specific features of the invention are shown in some drawings and not in others, this is for convenience only as each feature may be combined with any or all of the other features in accordance with the invention. The words “including”, “comprising”, “having”, and “with” as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A multilayer metamaterial isolator comprising:
a multilayer dielectric substrate;
a first layer or surface of the multilayer dielectric substrate including a first leg of a first resonator loop;
a second layer or surface of the multilayer dielectric substrate including a second leg of the first resonator loop; and
a third leg of the first resonator loop extending through the multilayer dielectric substrate interconnecting the first and second legs of the first resonator loop.

2. The isolator of claim 1 further including a second resonator loop having:
a first leg on the one layer or surface of the multilayer dielectric substrate adjacent the first leg of the first resonator loop,
a second leg on a different layer or surface of the multilayer dielectric substrate adjacent the second leg of the first resonator loop, and
a third leg extending through the multilayer dielectric substrate interconnecting the first and second legs of the second resonator loop.

3. The isolator of claim 2 in which the second legs of the first and second resonator loops include interdigitated spaced fingers.

4. The isolator of claim 1 in which the first and second layers of the multilayer dielectric substrate are separated by intermediate layers of the multilayer dielectric substrate.

5. The isolator of claim 1 in which the first leg and the second leg of the first resonator loop are offset.

6. The isolator of claim 1 in which the first resonator loop constitutes a unit cell, the isolator further including a strip of adjacent unit cells.

7. The isolator of claim 6 in which the multilayer dielectric substrate further includes adjacent patch radiators separated by said strip.

8. The isolator of claim 6 in which the multilayer dielectric substrate includes an array of radiators surrounded at least in part by said strip.

9. The isolator of claim 6 further including a first subsystem separated from a second subsystem by said strip.

10. The isolator of claim 9 in which the first subsystem includes a radar transmission subsystem and the second subsystem includes a radar receiving subsystem.

11. The isolator of claim 6 in which the multilayer substrate includes integrated circuitry and said strip is disposed between selected integrated circuit elements.

12. The isolator of claim 6 further including multiple strips of adjacent unit cells.

13. A metamaterial isolator comprising:
a dielectric substrate;
one region of the dielectric substrate including a first leg of a resonator loop;
a second region of the dielectric substrate including a second leg of the resonator loop; and
a third leg of the resonator loop extending through the dielectric substrate interconnecting the first and second legs of the resonator loop.

14. A metamaterial isolator comprising:
a substrate defined by first and second spaced planes and a third transverse plane; and
a resonator loop including one leg on the first plane of the substrate, a leg on the second plane, and a leg on the third plane interconnecting the first and second legs.

15. An isolator comprising:
a first resonator loop including:
a first leg extending in one direction,
a second leg spaced from the first leg and extending in the same direction, and
a third leg extending in a different direction interconnecting the first and second legs; and
a second resonator loop including:
a first leg adjacent the first leg of the first resonator loop,
a second leg adjacent the second leg of the first resonator loop, and
a third leg interconnecting the first and second legs of the second resonator loop.

16. The isolator of claim 15 in which the second legs of the first and second resonator loops include interdigitated spaced fingers.

17. The isolator loop of claim 15 in which the first and second resonator loops constitute a unit cell, the isolator further including a strip of adjacent cells.

18. The isolator of claim 17 in which the strip is located between adjacent patch radiators.

19. The isolator of claim 17 in the strip surrounds an array of radiators.

20. The isolator of claim 17 in which a first subsystem is separated from a second subsystem by said strip.

21. The isolator of claim 20 in which the first subsystem includes a radar transmission subsystem and the second subsystem includes a radar receiving subsystem.

22. The isolator of claim 17 in which a strip is disposed between selected integrated circuit components.

23. The isolator of claim 17 including multiple strips of adjacent unit cells.

24. The isolator of claim 15 further including a dielectric substrate, the first legs of the first and second resonator loops are on a first layer or surface of the dielectric substrate, the second legs of the first and second resonator loops are on a second layer or surface of the dielectric substrate, and the third legs of the first and second resonator loops extend through the dielectric substrate.

* * * * *